United States Patent [19]

Koehler et al.

[11] 4,256,802
[45] Mar. 17, 1981

[54] PROCESS FOR POLYISOCYANURATE FOAMS SUITABLE FOR PANELS

[75] Inventors: Charles E. Koehler, Baytown; Thomas R. McClellan, Seabrook; Pat L. Murray, Houston, all of Tex.

[73] Assignee: The Upjohn Company, Kalamazoo, Mich.

[21] Appl. No.: 127,478

[22] Filed: Mar. 5, 1980

Related U.S. Application Data

[63] Continuation-in-part of Ser. No. 47,019, Jun. 11, 1979, abandoned.

[51] Int. Cl.$^3$ .................. B32B 5/18; C08G 18/30; C08G 18/14; C08G 18/48
[52] U.S. Cl. .................. 428/310; 252/182; 521/118; 521/131; 521/167; 521/902; 428/313; 428/422.8
[58] Field of Search ................ 252/182; 521/118, 902, 521/131, 167; 428/422.8, 310, 313

[56] References Cited

U.S. PATENT DOCUMENTS

| | | | |
|---|---|---|---|
| 3,497,465 | 2/1970 | Kujawa et al. ................ | 521/167 |
| 3,574,755 | 4/1971 | McConnell et al. ............ | 252/182 |
| 3,661,860 | 5/1972 | Schwarz ..................... | 521/167 |
| 3,745,133 | 7/1973 | Comunale et al. ............. | 521/156 |
| 3,896,052 | 7/1975 | Lockwood et al. ............. | 525/125 |
| 3,903,346 | 9/1975 | De Leon et al. .............. | 428/322 |
| 4,026,837 | 5/1977 | Zimmerman et al. ............ | 521/902 |
| 4,101,465 | 7/1978 | Lockwood et al. ............. | 521/125 |

FOREIGN PATENT DOCUMENTS

| | | | |
|---|---|---|---|
| 2734400 | 2/1978 | Fed. Rep. of Germany ........ | 521/167 |
| 981135 | 1/1965 | United Kingdom ............ | 521/167 |
| 1154161 | 6/1969 | United Kingdom ............ | 521/167 |

OTHER PUBLICATIONS

McCutcheon's Detergents & Emulsifiers, 1973, No. American Edition, Allured Publ. Co., p. 191.

*Primary Examiner*—H. S. Cockeram
*Attorney, Agent, or Firm*—James S. Rose; Denis A. Firth

[57] ABSTRACT

Disclosed are novel polyol blends comprising from about 20 percent to about 85 percent by weight of said blend of an amine diol, or mixture of amine diols selected from the formula

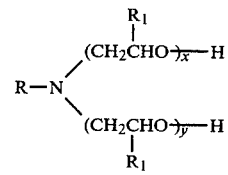

wherein R is an aliphatic radical having from 8 to 18 carbon atoms, inclusive, each $R_1$ is independently selected from the group consisting of hydrogen or methyl, x and y each independently have an average value from about 4 to about 15 inclusive; and from about 15 percent to about 80 percent by weight of a primary hydroxyl polyol characterized by a molecular weight of from about 60 to about 1000.

The polyol blends are miscible with fluorocarbon blowing agents and water and other adjuvants including trimerization catalysts.

The novel blends are particularly useful in an improved process for the preparation of polyisocyanurate foams. The foams are characterized by high reaction exotherms making such foams particularly suited to the preparation of polyisocyanurate foam laminates.

10 Claims, No Drawings

PROCESS FOR POLYISOCYANURATE FOAMS SUITABLE FOR PANELS

CROSS-REFERENCE TO RELATED APPLICATION

This application is a continuation-in-part of pending application Ser. No. 47,019 filed June 11, 1979, now abandoned.

BACKGROUND OF THE INVENTION

1. Field of the Invention

This invention relates to cellular polymers and intermediates therefor and is more particularly concerned with novel polyol blends and their use in a process for the preparation of cellular polyisocyanurates.

2. Description of the Prior Art

Cellular polyisocyanurate polymers are well known in the art for their use in various types of thermal insulating applications. They are also well known for their ability to withstand heat and flame; see U.S. Pat. Nos. 3,745,133, 3,986,991, and 4,003,859. Minor amounts of polyols are sometimes added to the foam forming ingredients to modify the foam properties. When fluorocarbon blowing agents are employed the problem of the incompatibility that may arise between the polyol, particularly primary hydroxyl polyols, and fluorocarbon in resin premixes is generally solved by premixing most, if not all, the fluorocarbon with the polyisocyanate; see the patents cited supra.

Polyisocyanurate foams find particular utility in the production of laminated foam board stock material which can be prepared with a variety of different facer materials. Problems which can arise in the production of such laminate material include (1) lack of uniform foam core strength; (2) poor adhesion between foam core and facer material; (3) maintaining good fire resistance in the form; and (4) keeping foam friability at low levels. These problems have been overcome in the art by employing minor amounts of low equivalent weight polyols, particularly diols, in the formulation, combined with the heating of the formed laminate product in an oven at 160° to 190° F.; see U.S. Pat. No. 3,903,346.

However, the low equivalent weight polyols employed, particularly the preferred diols (see column 4, lines 59-61 of U.S. Pat. No. 3,903,346) having only primary hydroxyl groups, cannot be blended beforehand with the fluorocarbon blowing agent in a "B" side component because of the low solubility of the diol-fluorocarbon pair. This necessitates the blending of the fluorocarbon with the polyisocyanate in the "A" side component. Further, because of the fluorocarbon diol immiscibility, the above patent teaches that a third component "C" is required which contains the catalyst constituent dissolved in a low molecular weight glycol; see column 2, lines 32-33 and the examples of U.S. Pat. No. 3,903,346.

Furthermore, a laminate prepared in accordance with the patent noted above must be heated in an oven to provide a product having a uniform foam core strength.

Surprisingly, it has been found that high levels of fluorocarbon blowing agent are completely miscible with low molecular weight polyols containing primary hydroxyl groups when novel blends comprising a certain type of amine diol with the primary hydroxyl polyols are employed. Additional ingredients which can be present in the miscible blends are surfactants, catalysts, and the like.

Further, it has been found that the same type of miscible primary hydroxyl containing blends as described above, except that water replaces the fluorocarbon component, can be obtained.

Furthermore, it has been discovered that the novel polyol blends above can be employed in minor amounts as a B type component to prepare polyisocyanate foams characterized by low friability, fine cell structure, good dimensional stability, and low flame spread, via a two-component, i.e., an A, and a B side, process. The fluorocarbon and water components act as the blowing agents in their respective foam forming formulations.

Further, the amine diol referred to above can be employed as the sole diol ingredient in combination with the fluorocarbon or water, catalyst, surfactant, and other adjuvants to provide polyisocyanurate foams in accordance with the present invention.

Quite unexpectedly, the presence of the amine diol in the B side gives rise to excellent reactant compatibility between the polyisocyanate and the other ingredients. This gives rise in turn to faster reactivity compared to prior art foams and very good reaction exotherm. The high exotherm is of particular advantage when foam laminates are being prepared because it results in excellent adhesion between foam and facer material thereby eliminating the need of heating the formed laminate in an oven.

SUMMARY OF THE INVENTION

This invention comprises polyol blends comprising from about 20 percent to about 85 percent by weight of said blend of an amine diol, or mixture of amine diols selected from the formula

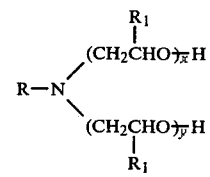

wherein R is an aliphatic radical having from 8 to 18 carbon atoms, inclusive, each $R_1$ is independently selected from the group consisting of hydrogen or methyl, x and y each independently have an average value from about 4 to about 15 inclusive; and from about 15 percent to about 80 percent by weight of a primary hydroxyl polyol (II) charcterized by a molecular weight of from about 60 to about 1000.

This invention also comprises miscible blends arising from the above polyol blends in combination with a fluorocarbon or water blowing agent.

This invention also comprises miscible blends arising from the above polyol blends in combination with a fluorocarbon or water blowing agent and an isocyanate trimerization catalyst.

The invention also comprises a process for the preparation of polyisocyanurate cellular polymers which utilizes, as a blended component, the diol (I) above wherein the values of x and y can have independent average values of from about 1 to about 15 but preferably from about 4 to about 15, with R and $R_1$ having the definitions set forth above, in combination with a fluorocarbon or water blowing agent and a trimerization catalyst, and, preferably, the blended component additionally containing the polyol (II) in which case the diol (I) is defined as above with the narrower range of x and y of about 4 to about 15, in the reaction with an organic polyisocyanate.

The invention also comprises the cellular polymers produced in accordance with the above process.

The invention also comprises a laminate panel having a polyisocyanurate foam core made in accordance with the improved process in accordance with the present invention.

The term "aliphatic radical" means alkyl and alkenyl having from 8 to 18 carbon atoms inclusive. Representative of alkyl are octyl, decyl, dodecyl, tetradecyl, hexadecyl, octadecyl, and isomeric forms thereof. Representative of alkenyl ar octenyl, decenyl, dodecenyl, tetradecenyl, hexadecenyl, octadecenyl, and isomeric forms thereof.

The polyol blends in accordance with the present invention can be used as the polyol ingredients in the preparation of polyurethane foams. Polyurethane foams are well known in the art for their use in a wide variety of applications including thermal and sound insulation for both industrial and residential buildings.

The polyol blends find particular utility, as set forth herein, as minor constituents in the preparation of polyisocyanurate foams particularly those polyisocyanurate foams prepared in foam laminate machinery and by spray foam equipment. Such foams are well known for their heat and fire resistance and are used in making laminate boards and foam bun stock which are both used in building construction for thermal and sound insulation.

DETAILED DESCRIPTION OF THE INVENTION

The polyol blends in accordance with the present invention are prepared simply by mixing together, in the proportions by weight set forth above, the amine diol (I) and primary hydroxyl polyol (II) defined above, in any suitable mixing vessel, holding tank, storage vessel, or the like. Preferably, the amine diol (I) is employed within a range of from about 25 percent to about 60 percent by weight of the blend while the primary hydroxyl polyol is employed within a range of from about 40 percent to about 75 percent by weight.

A preferred amine diol has the formula corresponding to (I) wherein both $R_1$ groups are hydrogen. A most preferrd amine diol has the formula corresponding to (I) wherein both $R_1$ groups are hydrogen, and x and y each independently have an average value from about 5 to about 10 inclusive.

The amine diols (I) are prepared using standard reactions known to those skilled in the art and in some instances the amine diols are commercially available. Typically, the amine diols (I) can be prepared by reacting the appropriate dialkanolamine with the appropriate aliphatic halide (R—X) compound, or mixture of different R—X compounds where all the aliphatic groups (R) fall within the definition above and X is halogen preferably chlorine or bromine. If the desired number of alkyleneoxy groups are not already present in the dialkanolamine prior to reaction with the aliphatic halide they can be readily added afterward by reacting the alkylated dialkanolamine with the appropriate number of moles of ethylene oxide or propylene oxide, or mixtures thereof, to provide the amine diols of formula (I).

Preferably, the amine diols (I) are prepared by reacting the appropriate primary fatty amine R—NH$_2$ or mixture of fatty amines wherein all the R groups are defined as above, with from about 2 to about 30 moles, preferably from about 8 to about 30 moles, most preferably 10 to 20 moles, of ethylene oxide or propylene oxide per molar proportion of fatty amine; see Bulletin 1294, entitled Ethoxylated Fatty Amines, Ashland Chemical Company, Division of Ashland Oil Inc., Box 2219, Columbus, Ohio 43216 for a detailed teaching of the preparation of the subject amine diols.

Illustrative of the starting fatty amines are octylamine, decylamine, dodecylamine, tetradecylamine, hexadecylamine, octadecylamine, and isomeric forms thereof. Illustrative of the alkenylamines are octenylamine, decenylamine, dodecenylamine, tetradecenylamine, hexadecenylamine, octadecenylamine, and isomeric forms thereof. Further illustrative of said fatty amines are mixtures of alkyl- and alkenylamines, for example, cocoamine which consists of the following mixture in approximate percent proportions by weight: 2% decylamine, 53% dodecylamine, 24% tetradecylamine, 11% hexadecylamine, 5% octadecylamine, and 5% octadecenylamine; soya amine in the following approximate proportions: 11.5% hexadecylamine, 4% octadecylamine, 24.5% oleylamine, 53% linoleylamine, and 7% linolenylamine; and tallow amine in the following approximate proportions: 4% tetradecylamine, 29% hexadecylamine, 20% octadecylamine, and 47% octadecenylamine. Further illustrative of the starting fatty amines are the halogenated fatty amines, particularly the chlorinated and brominated fatty amines, which, illustratively, can be made by the chlorination or bromination of cocoamine, soya amine, tallow amine, and the like.

A particularly preferred group of fatty amines consists of cocoamine mixture, soya amine mixture, and tallow amine mixture. A preferred member of this group is cocoamine.

The primary hydroxyl polyol (II) can be any primary hydroxyl polyol having a molecular weight of from about 60 to about 1000, preferably from about 60 to about 800, and most preferably from about 60 to about 600. Included in the polyols (II) are diols, triols, and tetrols. The preferred polyols are diols.

Included in the class of primary hydroxyl containing polyols are the various primary hydroxyl containing diols, triols, and tetrols disclosed in U.S. Pat. No. 3,745,133 which meet the molecular weight limitations set forth above and whose disclosure with respect to said polyols is incorporated by reference herein. The preferred classes are the polyester polyols prepared from dibasic carboxylic acids and polyhydric alcohols including those based on chlorendic anhydride, alkylene diols, alkoxyalkylene diols, polyalkylene ester diols, polyoxyalkylene ester diols, hydroxyalkylated aliphatic monoamines or diamines, the resole polyols (see Prep. Methods of Polymer Chem. by W. R. Sorenson et al., 1961, page 293, Interscience Publishers, New York, N.Y.), and polybutadiene resins having primary hydroxyl groups, (see Poly Bd Liquid Resins, Product Bulletin BD-3, October 1974, Arco Chemical Company, Div. of Atlantic Richfield, New York, N.Y.).

The most preferred classes are the alkylene diols, lower alkoxyalkylene diols, polyalkylene ester diols, and polyoxyalkylene ester diols.

Illustrative, but not limiting, of the preferred classes of polyols in accordance with the present invention are ethylene glycol, 1,3-propanediol, 1,4-butanediol, glycerine, trimethylolpropane, pentaerythritol; diethylene glycol, the polyoxyethylene glycols prepared by the addition of ethylene oxide to water, ethylene glycol, or diethylene glycol, etc., which provide triethylene glycol, tetraethylene glycol, and higher glycols, or mixtures thereof such that the molecular weight falls within the range set forth above; ethoxylated glycerine, ethoxylated trimethylolpropane, ethoxylated pentaerythritol, and the like; bis($\beta$-hydroxyethyl)terephthalate, bis($\beta$-hydroxyethyl)phthalate, and the like; polyethylene succinate, polyethylene glutarate, polyethylene adipate, polybutylene succinate, polybutylene glutarate, polybutylene adipate, copolyethylenebutylene succinate, copolyethylenebutylene glutarate, copolyethylenebutylene adipate, and the like hydroxy terminated polyesters; polyoxydiethylene succinate, polyoxydiethylene glutarate, polyoxydiethylene adipate, polyoxydiethylene adipate glutarate and the like; diethanolamine, triethanolamine, N,N'-bis($\beta$-hydroxyethyl)aniline, and the like.

The most preferred diols are diethylene glycol, and the polyoxydiethylene adipate glutarate polyester diols having a molecular weight from about 400 to about 600.

Particularly preferred are blends of from about 30 percent to about 50 percent by weight of diethylene glycol with from about 50 percent to about 70 percent by weight of a polyoxydiethylene adipate glutarate polyester diol having a molecular weight from about 400 to about 600.

In the preferred polyol blends in accordance with the present invention a fluorocarbon or water blowing agent is also present in the blend with the fluorocarbon being the preferred blowing agent.

When the blowing agent is a fluorocarbon the unexpected and advantageous features of the polyol blends of (I) and (II) can be realized fully. Accordingly, there can be obtained miscible polyol blends comprising at least about 25 percent by weight of a fluorocarbon blowing agent and the balance being a polyol blend of (I) and (II) within the proportions set forth above.

Surprisingly, there are obtained miscible polyol blends comprising from at least about 25 percent by weight to at least about 65 percent by weight of a fluorocarbon blowing agent and the corresponding 75 percent to about 35 percent by weight being the polyol blend of (I) and (II). The particular percentage of fluorocarbon to be dissolved in the blend will govern the proportions of (I) and (II) to be employed in any given instance and these proportions, falling within the range set forth above, can be easily determined by one skilled in the art by trial and error methods.

Even more surprising is the fact that miscible polyol blends comprising greater than 65 percent by weight of fluorocarbon can be readily obtained with the blends of (I) and (II) within the proportions set forth above in accordance with the present invention. Generally speaking, the lower the molecular weight of the primary hydroxyl polyol (II) the greater is the amount of fluorocarbon which can be dissolved in the blend at a given proportion of polyol (II) as opposed to a blend with a polyol (II) of higher molecular weight at the same proportion. In this connection, the alkylene diols, and lower alkoxyalkylene diols having molecular weights of less than 400 are preferred polyols of formula (II) with the latter lower alkoxyalkylene diols being most preferred.

The particular proportions of polyol (I) to polyol (II) to be employed in any particular polyol blend to obtain maximum miscibility with fluorocarbon can be determined by a process of trial and error.

When water is the blowing agent it is present in the proportions of from about 1 percent to about 6 percent, preferably from about 2 to about 5 percent by weight with the balance of 94 percent to 99 percent and preferably 95 to 98 percent comprising (I) and (II).

The fluorocarbon blowing agent can be any of the fluorocarbons known to those skilled in the art and which can be used for blowing polymer mixtures into cellular polymers. Generally speaking, such blowing agents are halogenated aliphatic hydrocarbons which are also substituted by chlorine and/or bromine in addition to the fluorine content and are well known to those skilled in the art; see U.S. Pat. No. 3,745,133, column 11, lines 25 to 38 which disclosure relating to fluorocarbon blowing agents is incorporated by reference herein.

In a preferred embodiment of a polyol blend in accordance with the present invention which finds particular utility in the preparation of polyisocyanurate foams, there is additionally present, in the blend of blowing agent and components (I) and (II), an isocyanate trimerization catalyst. The isocyanate trimerization catalyst component will be discussed in detail below. The isocyanate trimerization catalyst is advantageously present in the proportions of from about 2 to about 20, preferably from about 2 to about 15 weight percent, with the balance of about 80 to about 98, preferably about 85 to 98 percent comprising the blend of (I), (II), and blowing agent set forth above.

Surprisingly, the blowing agent and the polyol blend which includes the primary hydroxyl containing polyols are completely miscible in each other with no separation occurring upon storage, which miscibility is due to the presence of the amine diol (I). Aside from the advantages arising from having a stable, miscible blend of primary hydroxyl polyol and fluorocarbon or water, the beneficial effects of having the amine diol present as a minor constituent when preparing polyisocyanurate foams have been noted above.

Other optional additives can be added to the polyol blends without detracting from the miscibility and stability of the blends. Such additives include other optional polyol components such as secondary hydroxyl containing polyols, dispersing agents, cell stabilizers, surfactants, flame retardants, and the like which are commonly employed in the process of the invention.

In the preparation of polyisocyanurate foams in accordance with the present invention, the amine diol (I) described above can be employed as the sole polyol component in admixture with a fluorocarbon or water blowing agent and a trimerization catalyst to form a B side component for reaction with an A side comprised of an organic polyisocyanate. In this event the values of x and y in (I) can have the broader ranges as noted above of from about 1 to about 15.

The percent by weight proportions of the blend ingredients are the same as those set forth above for the proportions of catalyst to be blended with blowing agent and polyol component. That is to say the B blend is comprised of from about 2 to about 20, preferably from about 2 to about 15 percent by weight of a trimerization catalyst and from about 80 to about 98, preferably about 85 to 98 percent by weight of amine diol (I) and blowing agent. In the event that a fluorocarbon blowing agent is employed it is present in the proportions of about 20 to about 80, preferably from about 20 to about 50 percent by weight in respect of the amine diol (I), which, accordingly, is present from about 20 to about 80, preferably from about 50 to about 80 percent by weight.

In the event that water is employed as the blowing agent it is present in the proportions of from about 1 to about 6, preferably from about 2 to about 5 percent by weight in respect of the amine diol (I), which, accordingly, is present from about 94 to about 99, preferably 95 to 98 percent by weight.

The B side blend is advantageously employed in an amount falling within the range of from about 10 parts to about 120 parts, preferably from about 10 to about 80 parts, most preferably from about 20 parts to about 60 parts by weight per equivalent of polyisocyanate; provided the total hydroxyl equivalents present in said blend (B) are within a range of from about 0.05 to about 0.5 equivalent, preferably about 0.08 to about 0.4 equivalent, per equivalent of said polyisocyanate.

Preferably there is also present in the B side blend a minor amount of the primary hydroxyl polyol (II) described above. This combination in the blend not only gives rise to the stabilized miscible blends discussed above, but, additionally provides polyisocyanurate foams having the optimum advantageous properties discussed above, including the preparation of foam laminates which require no oven heating in order to achieve maximum foam strength and adhesion to the laminate facers. In this event the values of x and y in (I) have the narrower ranges as noted above of from about 4 to about 15.

The blend containing the amine diol (I) primary hydroxyl polyol (II), blowing agent, and trimerization catalyst is also employed in an amount falling within the same range of parts per isocyanate equivalent set forth above for the B blend containing only the amine diol (I); and with the same proviso set forth above for the range of total hydroxyl equivalents per equivalent of isocyanate. The proportions of each ingredient in the blend in percent by weight of the blend are the same proportions set forth in the description of the polyol blends. The amine diol (I), primary hydroxyl polyol (II) and blowing agent, all have the same significance and scope set forth above.

The trimerization catalyst employed can be any catalyst known to those skilled in the art which will catalyze the trimerization of an organic isocyanate compound to form the isocyanurate moiety. Further, a combination of urethane forming catalyst and trimerization catalyst can be employed if desired.

For typical isocyanate trimerization catalysts see The Journal of Cellular Plastics, November/December 1975, page 329; U.S. Pat. Nos. 3,745,133, 3,896,052, 3,899,443, 3,903,018, 3,954,684, and 4,101,465, the disclosures of these references being hereby incorporated by reference herein.

Preferred as catalysts are the ones disclosed in U.S. Pat. Nos. 3,896,052, and 4,101,465. The former reference discloses the catalyst combination of (a) an alkali metal salts of an N-substituted amide with (b) an alkali metal salt of an N-(2-hydroxyphenyl)methyl glycine and optionally (c) a tertiary amine trimerization catalyst. The latter reference discloses the combination of the same (a) and (b) components above with a hydroxyalkyltrialkylammonium carboxylate salt component.

The organic polyisocyanates which can be employed in the preparation of the polyisocyanurate foams in accordance with the present invention can be any of the organic polyisocyanates conventionally employed in the art for this purpose previously. Advantageously, and in order to obtain foams having exceptionally high heat resistance and structural strength, the preferred polyisocyanates are the polymethylene polyphenyl polyisocyanates, particularly those set forth in U.S. Pat. No. 3,745,133 whose disclosure with respect to said isocyanates is incorporated by reference herein. Also preferred are the polymethylene polyphenyl polyisocyanates treated with a minor amount of an epoxy compound to reduce acidic impurities in accordance with U.S. Pat. No. 3,793,362; and the polymethylene polyphenyl polyisocyanates which contain high levels of the 2,4'-isomer as typically disclosed in U.S. Pat. No. 3,362,979.

A most preferred organic polyisocyanate is a mixture containing from about 30 percent to about 85 percent by weight of methylenebis(phenyl isocyanate) and the remainder of said mixture comprises polymethylene polyphenyl polyisocyanates of functionality higher than 2.0.

In carrying out the preparation of polyisocyanurate foams in accordance with the process of the invention, and, in particular, polyisocyanurate foams for the preparation of foam laminates, the procedures and equipment conventional in the art are employed (see patents cited supra); for a detailed teaching of the mode of preparation, and utility of, polyisocyanurate foam laminates see U.S. Pat. No. 3,896,052 whose disclosure relative thereto is incorporated by reference herein.

The following examples describe the manner and process of making and using the invention and set forth the best mode contemplated by the inventors by carrying out the invention but are not to be construed as limiting.

EXAMPLE 1

The following five polyisocyanurate foams (Foam A through E) were prepared in accordance with the following procedure.

The foams were prepared as hand-mix samples by blending together the A and the B side ingredients (in parts by weight) set forth in Table I below, in 1 qt. cups. The polyisocyanate ingredient was the sole component of the A side while the B side ingredients which are listed in Table I were premixed and observed prior to being reacted with the polyisocyanate. The blending operation was carried out by thoroughly mixing the A and B sides in the cup with a high speed drill press motor equipped with a stirrer blade. The mixture was rapidly poured into a cardboard box and allowed to rise freely and cure at room temperature (circa 20° C.).

Foams B and E are in accordance with the present invention while A, C, and D are not because the amine diol component had values of x and y below that called for. The B sides in all of the formulations were clear with no evidence of turbidity. However, in the case of A and C, secondary hydroxyl polyols were present which are known fluorocarbon solubilizers while in C there was present additionally the phosphate plasticizer. Foam D also contained the plasticizing ingredient.

Maximum foam properties with respect to the combination of maximum reaction exotherm with rapid firm rate and low core and surface friability were observed with Foam E.

The surface blush in respect of a rising foam sample is the point when the shiny and moist unreacted surface of the rising foam becomes dulled or blushed and indicates that an efficient curing or reaction has occurred at the surface. All of the foam samples showed a good surface blush.

TABLE I

| Foams | A | B | C | D | E |
|---|---|---|---|---|---|
| Ingredients (pts. by wt.) | | | | | |
| A side: | | | | | |
| Polyisocyanate I[1] | 100 | 100 | 100 | 100 | 100 |
| B side: | | | | | |
| Diethylene glycol | 5.7 | 5.4 | 6 | 6 | 8 |
| Varonic® L-202[2] | 5.7 | — | 6 | 6 | — |
| Varonic® K-215[3] | — | 23.5 | — | — | 8 |
| Pluracol® GP-730[4] | 5.7 | — | — | — | — |
| Pluracol® PEP-650[5] | — | — | 6 | — | — |
| Tris(dichloropropyl-phosphate) | — | 7.2 | 18 | 18 | — |
| Propoxylated polyol[6] | — | — | — | 6 | — |
| L-5420[7] | 1.25 | 1.25 | 1.25 | 1.25 | 1.25 |
| Fluorocarbon R-11B[8] | 25 | 25 | 25 | 25 | 25 |
| Catalyst I[9] | 3 | 3 | 3 | 3 | 3 |
| NCO/OH index | about 4 | about 4 | about 4 | about 4 | about 4 |
| Appearance of B component | clear and not turbid | clear and not turbid | clear and not turbid | clear and not turbid | clear and not turbid |
| Foam reaction exotherm (°F.) | 339 | 313 | 294 | 298 | 345 |
| Firm rate | rapid | slow | medium | rapid | rapid |
| Core friability | high | low | high | high | low |
| Surface friability | none | none | none | none | none |
| Surface blush | yes | yes | yes | yes | yes |

Footnotes to Table I
[1]Polyisocyanate I is a polymethylene polyphenyl polyisocyanate containing about 45 percent by weight of methylenebis(phenyl isocyanate) and the remainder of said mixture consisting of polymethylene polyphenyl polyisocyanate having a functionality greater than 2; the isocyanate equivalent = 133.
[2]Varonic® L-202 is the soya amine adduct obtained by the reaction of a 2 molar proportion of ethylene oxide with soya amine; amine equivalent wt. about 360; hydroxyl equiv. wt. about 180; supplied by Chemical Products Division, Ashland Chemical Company, Columbus, Ohio.
[3]Varonic® K-215 is the cocoamine adduct obtained by the reaction of a 15 molar proportion of ethylene oxide with cocoamine; amine equivalent wt. about 885; hydroxyl equiv. wt. about 442; supplied by Chemical Products Division, Ashland Chemical Company, Columbus, Ohio.
[4]Pluracol® GP-730 is a propoxylated glycerine product; hydroxyl equiv. wt. = 243, and is supplied by BASF Wyandotte Chemical Corp., Wyandotte, Mich.
[5]Pluracol® PEP-650 is a propoxylated pentaerythritol product; hydroxyl equiv. wt. = 148 and is supplied by BASF Wyandotte Chemical Corp., Wyandotte, Mich.
[6]Propoxylated polyol is the product obtained from propoxylating a mixture of sorbitol and toluene diamine to a hydroxyl number of 360, viscosity of 2500 centistokes at 25° C., and specific gravity of 1.072.
[7]L-5420: A rigid foam silicone surfactant having a hydroxyl number of about 119 supplied by Union Carbide Corp., Tarrytown, N.Y. 10591; see Union Carbide Bulletin F-43565, December 1971.
[8]Fluorocarbon R-11B is monofluorotrichloromethane blowing agent stabilized with allo-ocimene and supplied by DuPont Chemical Corp., Wilmington, Del.
[9]Catalyst I comprises a combination in the following proportions of (A.) 1 part of a solution comprised of (a) 45 percent by weight of potassium N-phenyl-2-ethyl-hexamide, (b) 27 percent ethylene glycol, and (c) 28 percent dimethylformamide; (B.) 3 parts of a solution comprised of 50 percent by weight of sodium N-(2-hydroxy-5-nonylphenyl)methyl-N-methyl glycinate in diethylene glycol; and (C.) 1 part of a solution comprised of 50 percent by weight of 2-hydroxypropyltrimethylammonium formate and 50 percent dipropylene glycol; and (D.) 1 part of a polyethyleneglycol (MW = 200).

EXAMPLE 2

The following foams were prepared in accordance with the procedure and apparatus described in Example 1 except as noted below. The foams of this example set forth a comparison of the prior art method (Foams F and H) versus the method in accordance with the present invention (Foams G and I).

The ingredients of the A and B sides are set forth in Table II below. The F and G pair contained a different polyisocyanate from the H and I pair. The A side of Foams F and H contained the fluorocarbon blowing agent in accordance with the prior art. When the same amount of the fluorocarbon was mixed into the B side to test miscibility, in both cases, the fluorocarbon separated from the other ingredients, namely, diethylene glycol, surfactant, and catalyst.

In the case of Foams G and I which contained the ethoxylated cocoamine in the B side, the fluorocarbon and other ingredients were completely miscible with the diethylene glycol component.

A comparison of the foam rise times between F and G, and H and I, clearly show a much faster rate for the foams in accordance with the invention (G and I) over the respective pair in accordance with the prior art (F and H). The dramatic rate increase clearly indicates the increased compatibility between the A and B sides which leads to better reaction between the two hence the faster rise times over the formulations of the prior art. While the ethoxylated amine used in Foams G and I is a tertiary amine, these types of high molecular weight tertiary amines are not strong bases and were used in G and I in very small amounts based on amine equivalents, i.e. 0.009 equivalents in each case. This low level of weak amine would not be enough to explain the dramatic rate increases of G and I over F and H respectively on the basis of amine catalysis alone.

TABLE II

| Foams | F | G | H | I |
|---|---|---|---|---|
| Ingredients (pts. by wt.) | | | | |
| A side: | | | | |
| Polyisocyanate I[1] | 100 | 100 | — | — |
| Polyisocyanate II[2] | — | — | 105 | 105 |
| Fluorocarbon R-11B | 21.5 | — | 22.5 | — |
| B side: | | | | |
| Diethylene glycol | 8.3 | 8.0 | 8.3 | 8.0 |
| Varonic® K-215 | — | 8.0 | — | 8.0 |
| L-5420 | 1.25 | 1.25 | 1.25 | 1.25 |
| Catalyst I | 3.0 | 3.0 | 3.0 | 3.0 |
| Fluorocarbon R-11B | — | 23 | — | 24 |
| NCO/OH index | 4.6 | 4.2 | 4.6 | 4.2 |
| Foam rise time (seconds) | | | | |
| Cream | 75 | 19 | 59 | 21 |
| Gel | 104 | 42 | 96 | 41 |
| Tack free | 116 | 49 | 106 | 47 |
| Exotherm (°F.) | 341 | 336 | 318 | 316 |
| Core density, pcf | 1.76 | 1.74 | 1.79 | 1.75 |
| Dry heat age 300° F./24 hrs. | | | | |
| % Δ volume | +4.6 | +4.1 | +2.9 | +2.4 |
| Core friability, %[3] | 31 | 30 | 22 | 19 |
| Surface friability | none | none | none | none |
| Surface blush | yes | yes | yes | yes |

Footnotes to Table II
[1]See Footnote 1, Table I.
[2]Polyisocyanate II is a polymethylene polyphenylpolyisocyanate containing about 35 percent by weight of methylenebis(phenyl isocyanate) and the remainder of said mixture consisting of polymethylene polyphenyl polyisocyanate having a functionality greater than 2; the isocyanate equivalent = 140.
[3]The friability is the percent sample weight loss over a 10 minute period and determined in accordance with ASTM Test method C-421.

EXAMPLE 3

The following two polyisocyanurate foams J and K in accordance with the present invention were prepared in accordance with the procedure and apparatus described in Example 1 and using the ingredients in the proportions by weight set forth in Table III below. The B components were clear in both cases.

Both foams were very fine celled in structure with no surface friability and a good surface blush was observed. The foam exotherms were good and the rapid rise profiles indicated the fast reactivity for both foams.

It is noteworthy that the catalyst mixture employed in both J and K contained a very minor amount of the Varonic® K-215 amine diol which acted as a compatibilizing agent for the various other catalyst components. In the absence of the Varonic® K-215 the other catalyst components are not completely miscible.

TABLE III

| Foam | J | K |
|---|---|---|
| Ingredients (pts. by wt.) | | |
| A side: | | |
| Polyisocyanate III[1] | 135 | 135 |
| B side: | | |
| Varonic® K-205[2] | 37 | — |
| Varonic® K-215 | — | 75 |
| DC-193[3] | 1.5 | 1.5 |
| Fluorocarbon R-11B | 22 | 27 |
| Catalyst II[4] | 3 | 3 |
| NCO/OH index | 4.5 | 4.5 |
| B mix appearance | clear | clear |
| Foam rise time (seconds) | | |
| Cream | 5 | 6 |
| Gel | 20 | 20 |
| Tack free | 30 | 40 |
| Rise | — | — |
| Exotherm (°F.) | 328 | 305 |
| Surface friability | none | none |
| Surface blush | yes | yes |
| Core friability | low | low |
| Appearance | very fine cell | very fine cell |

Footnotes to Table III
[1]Polyisocyanate III is a polymethylene polyphenyl polyisocyanate containing about 45 percent by weight of methylenebis (phenyl isocyanate) and the remainder of said mixture consisting of polymethylene polyphenyl polyisocyanates having a functionality greater than 2, the isocyanate equivalent = 135.
[2]Varonic® L-205 is the cocoamine adduct obtained by the reaction of a 5 molar proportion of ethylene oxide with cocoamine; amine equivalent wt. = about 445; hydroxyl equiv. wt. about 222; supplied by Chemical Products Division, Ashland Chemical Company, Columbus, Ohio.
[3]DC-193 is a silicone surfactant supplied by Dow Corning, Midland, Mich.; see Bulletin 05-146, February 1966.
[4]Catalyst II comprises a combination in the following proportions of: (A.) 1 part of a solution comprised of 50 percent by weight of sodium N-(2-hydroxy-5-nonyl phenyl)methyl-N-methyl glycinate in diethylene glycol; (B.) 0.50 part of potassium acetate; (C.) 0.30 part of water; and (D.) 0.50 part of Varonic® K-215 which is described in Footnote 3 of Table I above. It should be noted that this catalyst blend is completely clear and miscible. Preparation of the same catalyst blend but without the K-215 component yields a turbid and cloudy mixture.

EXAMPLE 4

The following two water blown polyisocyanurate foams L and M were prepared in accordance with the present invention using the procedure and apparatus described in Example 1 and using the ingredients in the proportions by weight set forth in Table IV below. The B side in both cases formed a clear miscible blend.

The foam rise characteristics were found to be very rapid with a quick tack free time in spite of the foams being water blown. High foam exotherms were also observed attesting to the excellent conversions. The resulting foam physical properties were good.

TABLE IV

| Foams | L | M |
|---|---|---|
| Ingredients (pts. by wt.) | | |
| A side: | | |
| Polyisocyanate III | 135 | 135 |
| B side: | | |
| Polyol blend I[1] | 23 | 30 |
| L-5420 | 2 | 2 |
| H$_2$O | 1 | 1 |
| Catalyst II | 3 | 3 |
| NCO/OH index (including H$_2$O) | 3 | 2.5 |
| B mix appearance | clear | clear |
| Foam rise time (seconds) | | |
| Cream | 15 | 13 |
| Gel | 31 | 26 |
| Rise | 48 | 48 |
| Tack free | 35 | 30 |
| Exotherm (°F.) | 376 | 383 |
| Density (pcf) | 2.65 | 2.81 |

TABLE IV-continued

| Foams | L | M |
|---|---|---|
| K-factor[2] in BTU (ft.[2]) (hr.) °F./in.: | | |
| in ∥ dir. | 0.190 | 0.201 |
| in ⊥ dir. | 0.189 | 0.193 |
| Compressive str. (psi) | | |
| ∥ to rise | 39.5 | 42 |
| ⊥ to rise | 30.0 | 20 |
| % Δ Volume at 70° C., 100% relative humidity after 24 hrs. | −7.7 | −4.7 |
| 300° F. Dry Age Δ Volume (%) after 24 hrs. | −2.9 | +3.0 |

Footnotes to Table IV
[1]Polyol blend I comprises a blend in the following proportions of (A.) 40.8 pts. of a polyoxydiethylene adipate glutarate polyester diol of M.W. = 500; (B.) 28.6 pts. of diethylene glycol; and (C.) 30.6 pts. of Varonic® K-215.
[2]K-Factor is a measure of thermal conductivity of materials by determining heat flow in accordance with ASTM Test method C-518.

EXAMPLE 5

This example sets forth a hand-mix polyisocyanurate foam N prepared in accordance with the present invention using the procedure and apparatus described in Example 1 and the ingredients set forth in Table V below.

The B side of sample N contained a mixture of primary hydroxyl triol and diethylene glycol with a 41% by weight proportion of fluorocarbon yet the blend stayed clear with no turbidity.

The foam had fast rise times with a good exotherm and good friability characteristics.

TABLE V

| Foam | N |
|---|---|
| Ingredients (pts. by wt.) | |
| A side: | |
| Polyisocyanate III | 135 |
| B side: | |
| TPEG-990[1] | 8.5 |
| Diethylene glycol | 6.5 |
| Varonic® K-215 | 10 |
| DC-193 | 1.25 |
| Catalyst II | 3.0 |
| Fluorocarbon R-11B | 20 |
| B mix appearance | clear no turbidity |
| % R-11B in B mix | 41% |
| Foam rise time (seconds) | |
| Cream | 13 |
| Gel | 30 |
| Tack free | 35 |
| Exotherm (°F.) | 349 |
| Surface friability | none |
| Surface blush | yes |
| Core friability | low |

Footnote to Table V
[1]TPEG-990 is a primary hydroxyl containing trifunctional polyethylene glycol having an OH E.W. = 333; and is supplied by Union Carbide Corp., New York, N.Y.

EXAMPLE 6

The following high temperature and flame resistant polyisocyanurate foam laminates were prepared in accordance with the present invention using the foam O which was prepared from the ingredients set forth in Table VI below.

A Viking laminating machine was used with "A" and "B" component temperatures of 73° F. and 70° F. respectively. Throughput was 15 lbs./min. through a low pressure impingement mixing head. A pour lay down technique was used instead of a nip roll. The conveyor speed was 10 ft./min. and the curing oven temperature was at ambient (70° to 90° F.).

Two inch thick laminate was prepared with 0.0015" aluminum foil facers and also prepared with asphalt facers. The foam properties reported in Table VI below are for the foam core material after the facers had been removed. Therefore, the facer material itself has no affect on this data. The adhesion between facer material and foam was excellent.

The component B, although containing the primary hydroxyl polyester and diethylene glycol and a 43% by weight content of freon (R-11B) was clear with no turbidity.

The laminates were prepared without the necessity of oven curing at a high temperature because of the rapid reactivity of the formulation. The rapid reactivity also was reflected in the rapid rise profile and the fact that foam friability was found to be very low in spite of the lack of a high temperature cure step. Good facer adhesion, as noted above, was also observed.

The overall foam physical properties were found to be good including the very low friability, good fire resistance, K factor, and humid age data.

TABLE VI

| Foam | O |
|---|---|
| Ingredients (pts. by wt.) | |
| A side: | |
| Polyisocyanate I | 133 |
| B side: | |
| Polyester diol[1] | 9 |
| Diethylene glycol | 6.3 |
| Varonic® K-215 | 6.7 |
| DC-193 | 1.25 |
| Catalyst II | 3.0 |
| Fluorocarbon R-11B | 20.0 |
| B mix appearance | clear no turbidity |
| % R-11B in B mix | 43% |
| NCO/OH index | 4.9 |
| Foam rise time (seconds) | |
| Cream | 19 |
| Gel | 40 |
| Tack free | 47 |
| Surface friability | none |
| Surface blush | yes |
| Core friability | low (6%) |
| Overall density (pcf) | 2.0 |
| Core density | 1.8 |
| Compressive str.(psi) | |
| ∥ to rise | 31 |
| Compressive str. (psi) | |
| ⊥ to rise | 21 |
| Closed cells[2] | 94% |
| K Factor in | |
| BTU (ft.[2]) (hr.) °F./in. | 0.14 |
| Humid age (158° F., 95% R.H.) | |
| Δ Vol., after 1 day | +6% |
| 7 days | +6.5% |
| 28 days | +7.0% |
| ASTM E-84 Test on 2" thick samples: | |
| Flame spread rating | 38 |
| Smoke | 187 |

Footnotes to Table VI
[1]Polyester diol is the same diol described in Footnote 1 of Table IV under A.
[2]Closed cells are determined by the air pycnometer test in accordance with ASTM Test method D-2856.

EXAMPLE 7

A series of blends of fluorocarbon R-11B (monofluorotrichloromethane) with two typical primary hydroxyl polyols of the present invention were prepared. The proportions by weight employed, including the amount of amine diol when present, varied according to the values set forth in Table VII below. The blends were observed for their miscibility and clearness or their turbidity and separation of the fluorocarbon from solution.

Blends A through D contained diethylene glycol with fluorocarbon and in the absence of amine diol, i.e., 100% diethylene glycol, the maximum fluorocarbon solubility was 15% by weight. The addition of 10 percent by wt. amine diol was not sufficient to impart fluorocarbon solubility at the 25% by wt. level whereas a 20 percent amine diol content (blend D) did result in a clear miscible solution at 25 percent fluorocarbon.

Blends E through J contained a polyester diol defined above wherein the pure polyester diol was capable of dissolving 20 percent by weight fluorocarbon but not 25 percent. The break for 25 percent fluorocarbon solubility started at about 10 parts by weight of the amine diol (blend G) while at the 20 percent level of amine diol the fluorocarbon could reach up to 31 percent by wt.

Blends K through M were observed to have maximum fluorocarbon levels of greater than 90 percent and up to 67.5 percent for diethylene glycol and the polyester diol respectively when a maximum of 85 percent by weight of amine diol was employed.

Blends N through Q were observed to have maximum fluorocarbon solubilities of 60 percent and 50 percent respectively for diethylene glycol and polyester diol when the primary alcohol-amine diol blends were 50/50 percent by weight.

TABLE VII

| Blend | A | B | C | D | E | F | G | H | I |
|---|---|---|---|---|---|---|---|---|---|
| Ingredients (pts. by wt.) | | | | | | | | | |
| Diethylene glycol | 100 | 100 | 90 | 80 | — | — | — | — | — |
| Polyester diol[1] | — | — | — | — | 100 | 100 | 90 | 80 | 80 |
| K-215[2] | — | — | 10 | 20 | — | — | 10 | 20 | 20 |
| Fluorocarbon R-11B | 17.6 | 25 | 33.3 | 33.3 | 25 | 33.3 | 33.3 | 40 | 45 |
| % by wt. primary alcohol | 100 | 100 | 90 | 80 | 100 | 100 | 90 | 80 | 80 |
| % by wt. amine diol | 0 | 0 | 10 | 20 | 0 | 0 | 10 | 20 | 20 |
| % by wt. fluorocarbon | 15 | 20 | 25 | 25 | 20 | 25 | 25 | 28.5 | 31 |
| Blend appearance | clear miscible | turbid separates | turbid separates | clear miscible | clear miscible | turbid separates | clear miscible | clear miscible | clear miscible |

| Blend | J | K | L | M | N | O | P | Q |
|---|---|---|---|---|---|---|---|---|
| Ingredients (pts. by wt.) | | | | | | | | |
| Diethylene glycol | — | 15 | — | — | 50 | 50 | — | — |
| Polyester diol[1] | 80 | — | 15 | 15 | — | — | 50 | 50 |
| K-215[2] | 20 | 85 | 85 | 85 | 50 | 50 | 50 | 50 |
| Fluorocarbon R-11B | 50 | 900 | 207.7 | 233.3 | 150 | 175 | 100 | 120 |
| % by wt. primary alcohol | 80 | 15 | 15 | 15 | 50 | 50 | 50 | 50 |

TABLE VII-continued

| % by wt. amine diol | 20 | 85 | 85 | 85 | 50 | 50 | 50 | 50 |
|---|---|---|---|---|---|---|---|---|
| % by wt. fluorocarbon | 33.3 | 90 | 67.5 | 70 | 60 | 63.6 | 50 | 55 |
| Blend appearance | cloudy | clear miscible | clear miscible | turbid separates | clear miscible | turbid separates | clear miscible | turbid separates |

Footnotes to Table VII
[1] The same polyester diol described in Footnote 1 of Table IV under A.
[2] K-215 is the amine diol defined in Footnote 3 of Table I.

We claim:
1. In a process for the preparation of a cellular polymer in which the major recurring polymer unit is an isocyanurate moiety said process comprising the trimerization of an organic polyisocyanate in the presence of a minor amount of a polyol, a blowing agent, and a trimerization catalyst, the improvement which comprises preparing said cellular polymer by bringing together:
A. an organic polyisocyanate; and
B. from about 10 to about 120 parts by weight per equivalent of said polyisocyanate of a blend comprising:
  (a) about 2 to about 20 percent by weight of a polyisocyanate trimerization catalyst, and
  (b) about 80 to about 98 percent by weight of a mixture comprising:
    1. about 20 to about 80 percent by weight of a fluorocarbon blowing agent, and
    2. about 20 to about 80 percent by weight of a polyol component comprising an amine diol or mixture of amine diols selected from the formula

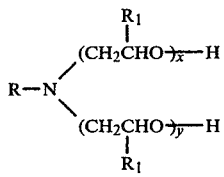

wherein R is an aliphatic radical having from 8 to 18 carbon atoms, inclusive, each $R_1$ is independently selected from the group consisting of hydrogen or methyl, x and y each independently have an average value from about 1 to about 15 inclusive; and
provided the total hydroxyl equivalents present in said blend (B) are within a range of from about 0.05 to about 0.5 equivalent per equivalent of said polyisocyanate.

2. In a process for the preparation of a cellular polymer in which the major recurring polymer unit is an isocyanurate moiety said process comprising the trimerization of an organic polyisocyanate in the presence of a minor amount of a polyol, a blowing agent, and a trimerization catalyst, the improvement which comprises preparing said cellular polymer by bringing together:
A. an organic polyisocyanate; and
B. from about 10 to about 120 parts by weight per equivalent of said polyisocyanate of a blend comprising:
  (a) about 2 to about 20 percent by weight of a polyisocyanate trimerization catalyst, and
  (b) about 80 to about 98 percent by weight of a mixture comprising:
    1. about 1 to about 6 percent by weight of water, and
    2. about 94 to about 99 percent by weight of a polyol component comprising an amine diol or mixture of amine diols selected from the formula

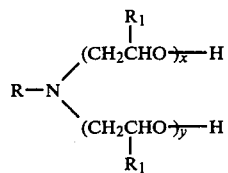

wherein R is an aliphatic radical having from 8 to 18 carbon atoms, inclusive, each $R_1$ is independently selected from the group consisting of hydrogen or methyl, x and y each independently have an average value from about 1 to about 15 inclusive; and
provided the total hydroxyl equivalents present in said blend (B) are within a range of from about 0.05 to about 0.5 equivalent per equivalent of said polyisocyanate.

3. In a process for the preparation of a cellular polymer in which the major recurring polymer unit is an isocyanurate moiety said process comprising the trimerization of an organic polyisocyanate in the presence of a minor amount of a polyol, a blowing agent, and a trimerization catalyst, the improvement which comprises preparing said cellular polymer by bringing together:
A. an organic polyisocyanate; and
B. from about 10 to about 120 parts by weight per equivalent of said polyisocyanate of a miscible blend comprising:
  (a) about 2 to about 20 percent by weight of a polyisocyanate trimerization catalyst, and
  (b) about 80 to about 98 percent by weight of a mixture comprising:
    1. at least about 25 percent by weight of a fluorocarbon blowing agent, and
    2. the balance being a polyol mixture comprising:
      (i) about 20 to about 85 percent by weight of an amine diol, or mixture of amine diols selected from the formula

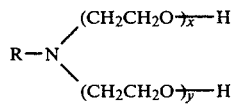

wherein R is an aliphatic radical having from 8 to 18 carbon atoms, inclusive, and x and y each independently have an average value from about 4 to about 15 inclusive; and
      (ii) about 15 to about 80 percent by weight of a primary hydroxyl polyol characterized by a molecular weight of from about 60 to about 1000; and provided the total hydroxyl equivalents present in said blend (B) are within a range of from about 0.05 to about 0.5 equivalent per equivalent of said polyisocyanate.

4. A process according to claim 3 wherein said polyisocyanate is a polymethylene polyphenyl polyisocyanate.

5. A process according to claim 3 wherein said polyol (ii) is a primary hydroxyl diol.

6. A process for the preparation of a cellular polymer in which the major recurring polymer unit is an isocyanurate moiety said process comprising bringing together:

A. a polymethylene polyphenyl polyisocyanate; and
B. from about 10 to about 120 parts by weight per equivalent of said polyisocyanate of a miscible blend comprising:
  (a) about 2 to about 20 percent by weight of a polyisocyanate trimerization catalyst, and
  (b) about 80 to about 98 percent by weight of a mixture comprising:
    1. at least about 25 percent by weight of a fluorocarbon blowing agent, and
    2. the balance being a polyol mixture comprising:
      (i) about 20 to about 85 percent by weight of an ethoxylated cocoamine diol mixture obtained from the reaction of about 15 moles of ethylene oxide with cocoamine, and
      (ii) about 15 to about 80 percent by weight of a primary hydroxyl diol having a molecular weight of from about 60 to about 800; and provided the total hydroxyl equivalents present in said blend (B) are within a range of from about 0.05 to about 0.5 equivalent per equivalent of said polyisocyanate.

7. A process according to claim 6 wherein the primary hydroxyl diol (ii) is diethylene glycol.

8. A process according to claim 6 wherein the primary hydroxyl diol (ii) is a polyoxydiethylene adipate glutarate polyester diol having a molecular weight from about 400 to about 600.

9. A process according to claim 6 wherein the primary hydroxyl diol (ii) comprises a mixture of from about 30 percent to about 50 percent by weight of diethylene glycol and from about 50 percent to about 70 percent by weight of a polyoxydiethylene adipate glutarate polyester diol having a molecular weight from about 400 to about 600.

10. A laminate panel comprising a foam core made in accordance with the process set forth in claim 3 and having the opposing faces of said core bonded to a facing material.

* * * * *